United States Patent
Morita et al.

(10) Patent No.: US 12,425,550 B2
(45) Date of Patent: Sep. 23, 2025

(54) INTERCOM DEVICE AND CONTROL SYSTEM

(71) Applicant: AIPHONE CO., LTD., Nagoya (JP)

(72) Inventors: Kazuyuki Morita, Nagoya (JP); Yuya Hino, Nagoya (JP); Hirokazu Kusunoki, Nagoya (JP); Takayuki Goto, Nagoya (JP); Yu Shimizu, Nagoya (JP); Ryoji Maeda, Nagoya (JP)

(73) Assignee: AIPHONE CO., LTD., Nagoya (JP)

( * ) Notice: Subject to any disclaimer, the term of this patent is extended or adjusted under 35 U.S.C. 154(b) by 100 days.

(21) Appl. No.: 18/549,983

(22) PCT Filed: Mar. 23, 2022

(86) PCT No.: PCT/JP2022/013529
§ 371 (c)(1),
(2) Date: Sep. 11, 2023

(87) PCT Pub. No.: WO2022/210168
PCT Pub. Date: Oct. 6, 2022

(65) Prior Publication Data
US 2024/0155084 A1    May 9, 2024

(30) Foreign Application Priority Data

Mar. 31, 2021 (JP) .................................. 2021-059170
Mar. 31, 2021 (JP) .................................. 2021-059171
(Continued)

(51) Int. Cl.
*H04N 7/18* (2006.01)
*G06F 3/041* (2006.01)
*G06F 3/04886* (2022.01)

(52) U.S. Cl.
CPC ............. *H04N 7/186* (2013.01); *G06F 3/041* (2013.01); *G06F 3/04886* (2013.01); *G06F 2203/04803* (2013.01)

(58) Field of Classification Search
CPC ..... H04N 7/186; G06F 3/041; G06F 3/04886; G06F 2203/04803; G06F 3/011;
(Continued)

(56) References Cited

U.S. PATENT DOCUMENTS

2010/0115562 A1*  5/2010  Koike ................... H04R 27/00
                                                    725/78
2012/0281061 A1   11/2012  Tsujino
(Continued)

FOREIGN PATENT DOCUMENTS

JP    2007-267253 A    10/2007
JP    2010-113682 A     5/2010
(Continued)

OTHER PUBLICATIONS

Patent Cooperation Treaty, International Search Report, Application No. PCT/JP2022/013529, dated Jun. 14, 2022, in 7 pages.

*Primary Examiner* — Michael E Teitelbaum
(74) *Attorney, Agent, or Firm* — PROCOPIO, CORY, HARGREAVES & SAVITCH LLP

(57) ABSTRACT

A building entrance device (10B) of an intercom device includes a touch operable aerial display (100) for displaying an aerial image (G1, G2) toward a visitor (W1, W2), and a control unit (110). The touch operable aerial display (100) includes: a display device (101) for emitting light; an optical member (102) for reflecting and transmitting light so as to form the aerial image (G1, G2) in a predetermined space; and a detection unit (103) for detecting an operation input of the visitor (W1, W2) to the aerial image (G1, G2). The control unit (110) changes at least one from among a display position, a display angle of the aerial images (G1, G2), and
(Continued)

a display mode of a call operation acceptance unit included in the aerial images (G1, G2).

8 Claims, 9 Drawing Sheets

(30) Foreign Application Priority Data

Mar. 31, 2021 (JP) ................................ 2021-059172
Mar. 31, 2021 (JP) ................................ 2021-059173

(58) Field of Classification Search
CPC ........... G06F 3/013; G06F 2203/04108; G06F 3/0425; H04M 9/02
See application file for complete search history.

(56) References Cited

U.S. PATENT DOCUMENTS

2016/0310228 A1 10/2016 Maeda et al.
2017/0024082 A1* 1/2017 Tachibana ............. G06F 3/0421
2018/0275414 A1* 9/2018 Tanaka ............... G02B 27/0093
2018/0329608 A1* 11/2018 Krishnasamy ........ G06F 9/4451
2021/0342030 A1 11/2021 Shinohara et al.

FOREIGN PATENT DOCUMENTS

| | | | |
|---|---|---|---|
| JP | 2013-017137 | A | 1/2013 |
| JP | 2014-067071 | A | 4/2014 |
| JP | 2015-125765 | A | 7/2015 |
| JP | 2016-095635 | A | 5/2016 |
| JP | 2017-062709 | A | 3/2017 |
| JP | 2019-045916 | A | 3/2019 |
| JP | 2019-109636 | A | 7/2019 |
| JP | 2019-109637 | A | 7/2019 |
| JP | 2019-139698 | A | 8/2019 |
| JP | 2019-193233 | A | 10/2019 |
| WO | 2016-047173 | A1 | 3/2016 |
| WO | 2019-043783 | A1 | 3/2019 |
| WO | 2020-075456 | A1 | 9/2019 |

* cited by examiner

INTERCOM DEVICE AND CONTROL SYSTEM

CROSS-REFERENCE TO RELATED APPLICATIONS

This application is US National Stage of International Patent Application PCT/JP2022/013529, filed Mar. 23, 2022 the contents of which are incorporated herein by reference.

FIELD

The present disclosure relates to an intercom device and a control system.

BACKGROUND

Patent Document 1 discloses an intercom device including an entrance slave unit provided with a function of calling and talking to a resident, and a living room master device provided with a function of responding to a call from the entrance slave unit.

CITATION LIST

Patent Literature

Patent Document 1: JP-A-2007-267253

SUMMARY

Technical Problem

With the conventional intercom device disclosed in Patent Document 1, a stationary hardware device is used as an entrance slave device. For example, in a case in which a visitor is a low-height person such as a child, it is difficult to operate the entrance slave device.

Also, with the conventional intercom device disclosed in Patent Document 1, also in a nurse call system installed in a hospital or the like, a stationary hardware device (hardware component) is used as a nurse call master device. In recent years, it has been conceived that a touch operable aerial display is used in combination with a hardware device such as an entrance slave unit or a nurse call master device.

Also, in recent years, the use of a touch operable aerial display as an alternative device to a hardware device has been considered. However, it is not realistic to always display a touch operable aerial display because of the problem of power consumption.

Accordingly, an object of the present disclosure is to provide an intercom device that is capable of improving an operability of an entrance slave apparatus.

Another object of the present disclosure is to provide a control system that is capable of improving control quality in a case in which a hardware device and a touch operable aerial display coexist.

Another object of the present disclosure is to provide an intercom device that is capable of improving an operability of an entrance slave device and of reducing a power consumption of a touch operable aerial display.

Solution to Problem

In order to achieve the above object, an intercom device according to the present disclosure includes: an entrance slave unit for a visitor to call and talk to a resident; and a living room master device for the resident to respond to a call from the entrance slave unit. The entrance slave unit includes: a touch operable aerial display for displaying an aerial image toward the visitor; and a control unit for controlling the touch operable aerial display. The touch operable aerial display includes a light source for emitting light for generating the aerial image, an optical member for reflecting and transmitting the light and for forming an image in a predetermined space, and a detection unit for detecting an operation input of the visitor to the aerial image. The control unit changes at least one of a display position of the aerial image, a display angle of the aerial image, and a display mode of a call operation acceptance unit including the aerial image.

In order to achieve the above object, the control system of the present disclosure is used for at least one of an intercom system and a nurse call system. The control system includes: a hardware device having an operation acceptance unit; a touch operable aerial display for displaying an aerial image toward a user, and a control unit for controlling the hardware device and the touch operable aerial display. The touch operable aerial display includes a light source for emitting light for generating the aerial image, an optical member for reflecting and transmitting the light and for forming an image in a predetermined space, and a detection unit for detecting an operation input of the user to the aerial image. When both a first operation input of the user for the operation acceptance unit and a second operation input of the user for the aerial image are received, the control unit cancels a processing based on an operation input received first, and executes a processing based on an operation input received later, among of the first operation input and the second operation input.

In order to achieve the above object, the intercom device according to the present disclosure includes an entrance slave unit for calling and talking to a resident, and a living room master device for the resident to respond to a call from the entrance slave unit. The entrance slave unit includes a touch operable aerial display for displaying an aerial image toward the visitor, a control unit for controlling the touch operable aerial display, and a first sensor for detecting the visitor. The touch operable aerial display includes a light source for emitting light for generating the aerial image, an optical member for reflecting and transmitting the light and for forming an image in a predetermined space, and a detection unit for detecting an operation input of the visitor to the aerial image. The control unit starts a display of the aerial image when the visitor is detected by the first sensor.

Advantageous Effect of the Invention

According to the present disclosure, it is possible to provide an intercom device that is capable of improving an operability of an entrance slave apparatus.

Furthermore, with the present disclosure, it is possible to provide a control system that is capable of improving control quality in a case in which a hardware device and a touch operable aerial display coexist.

Furthermore, with the present disclosure, it is possible to provide an intercom device that is capable of improving an operability of an entrance slave unit and of reducing a power consumption of a touch operable aerial display.

DESCRIPTION OF EMBODIMENTS

Description will be made below with reference to the drawings regarding an intercom device and a control system provided with the intercom device according to the present disclosure.

Figure 1:
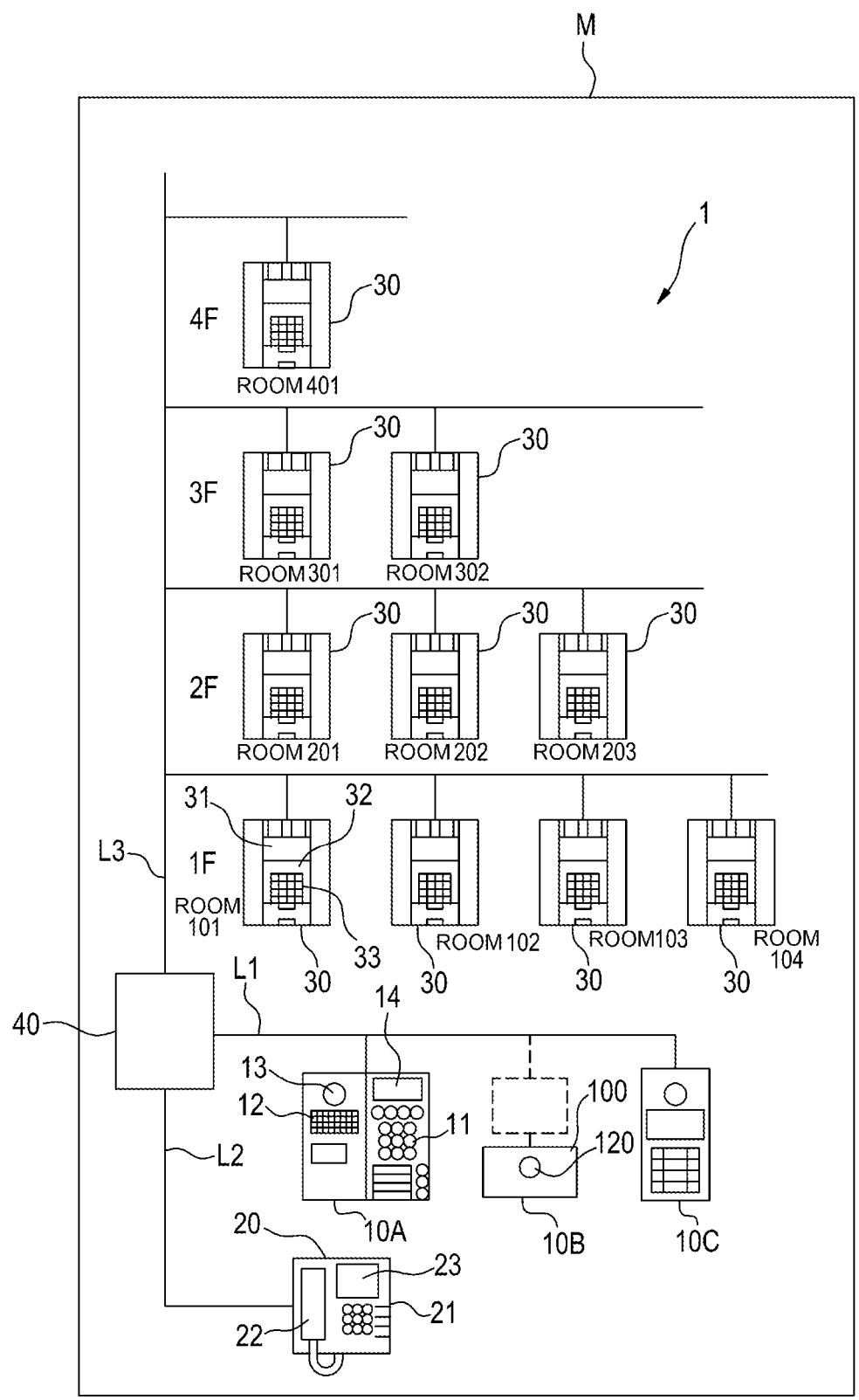
FIG. 1 is a configuration diagram showing an intercom device according to the present disclosure.

FIG. 1 is a configuration diagram showing an intercom device 1 according to the present disclosure. As shown in FIG. 1, the intercom device 1 is used for an apartment complex M such as a condominium which divides a single building into multiple residential units. The intercom device 1 includes a building entrance device 10 (10A through 10C: an example of an entrance slave apparatus), a control room master device 20, a living room master device 30, and a control device 40. The building entrance device 10, the control room master device 20, the living room master device 30, and the control device 40 are connected to each other via a network (which is referred to as LAN "Local Area Network" in the present embodiment) through which communication is executed according to a general-purpose protocol.

The building entrance devices 10A through 10C (hereinafter, collectively referred to as "building entrance device 10" in the case of a generic term) are installed, for instances, in a building entrance, common areas of the apartment complex M. The building entrance device 10 is configured to be capable of calling up a living room master device 30 or a control room master device 20 in the apartment complex M, for example. Furthermore, the building entrance device 10 is configured to be capable of capturing an image of a visitor, for example.

As the building entrance device 10, for example, there are a contact-type building entrance device provided with a stationary operation acceptance unit (hardware device) as shown in the building entrance device 10A or 10C, a non-contact-type building entrance device provided with an aerial display-type touch display as shown in the building entrance device 10B, or the like. For example, the contact-type building entrance device 10A includes an operation unit 11 for inputting a room number or the like, a call unit 12 for talking to a resident or the like, a camera 13 for capturing an image of a visitor, a display unit 14 for displaying various kinds of information, and the like. The non-contact type building entrance device 10B includes a camera 120 for capturing an image of a visitor, a touch operable aerial display 100 for displaying an image in the air (hereinafter, referred to as an "aerial image"), and the like.

The building entrance devices 10A through 10C store unique information (e.g., building entrance device ID: identification, etc.) that identifies the respective building entrance devices. The building entrance device 10 is connected to the control device 40 via an intercom line (dedicated line) L1. The building entrance device 10 is capable of communicating with the living room master device 30, the control room master device 20, and the like via the control device 40. It should be noted that, in the present example, three building entrance devices (building entrance devices 10A through 10C) are connected to the control device 40. However, the number of the building entrance devices to be connected is not restricted to this number.

The control room master device 20 is provided in a control room of an apartment complex. The control room master device 20 includes an operation unit 21, a call unit 22, a display unit 23, and the like. The control room master device 20 stores unique information (e.g., control room master device ID, etc.) for identifying the control room master device. The control room master device 20 is connected to the control device 40 via an intercom line L2. The control room master device 20 is capable of communicating with the living room master device 30, the building entrance device 10, or the like via the control device 40.

The living room master device 30 is installed in each residential area of the apartment complex. The living room master device 30 includes a display unit 31, an operation unit 32, a call unit 33, and the like. The living room master device 30 stores unique information (e.g., an living room master device ID or the like) that identifies the living room master device. The living room master device 30 is connected to the control device 40 via an intercom line L3. The living room master device 30 is capable of communicating with the building entrance device 10, the control room master device 20, or the like via the control device 40.

The control device 40 controls communication between the building entrance device 10, the control room master device 20, and the living room master device 30, connected via an intercom line. The control device 40 stores unique information (e.g., a controller ID or the like) that identifies the control device.

Figure 2:
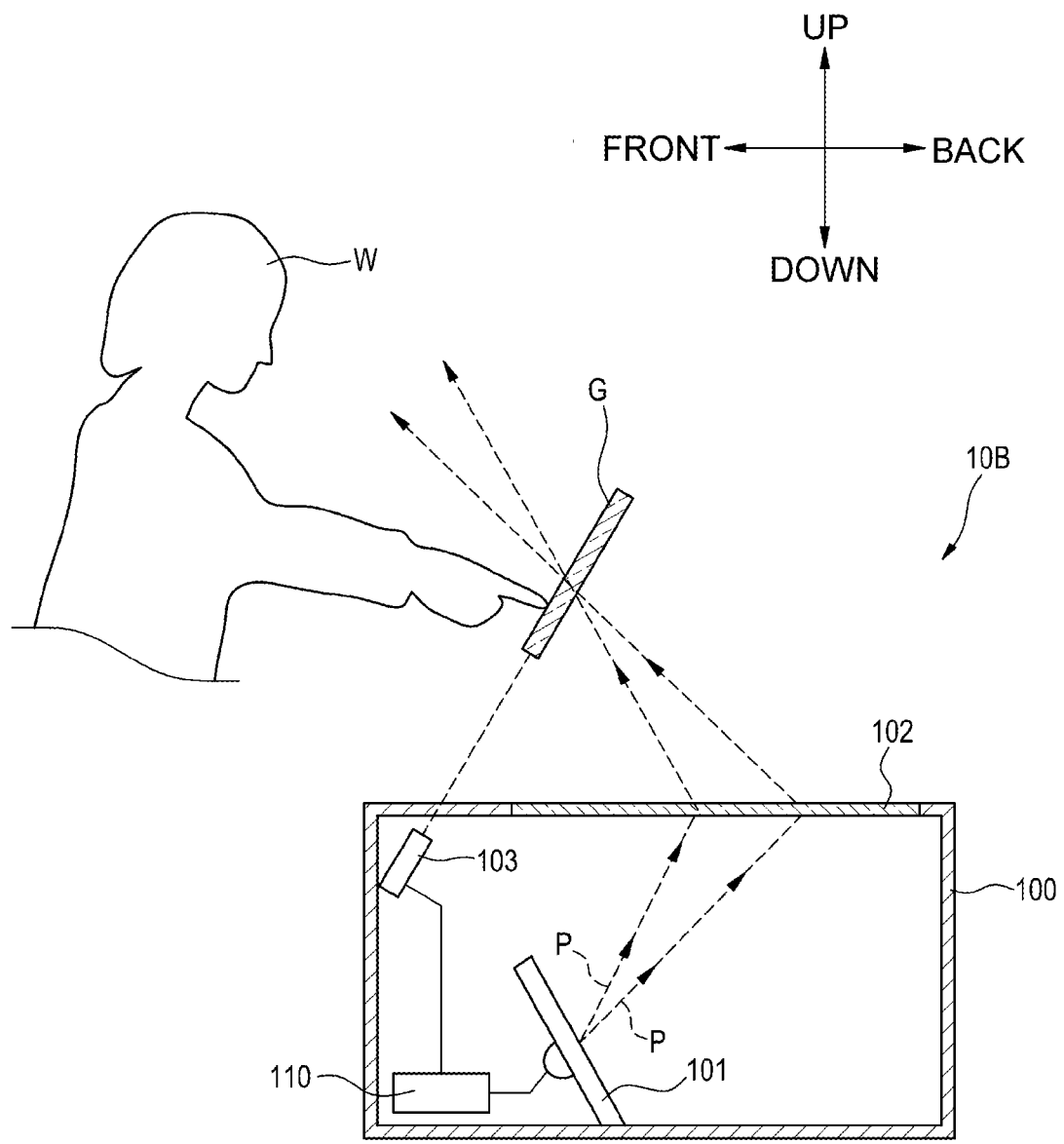
FIG. 2 is a schematic diagram showing a building entrance device provided with a touch operable aerial display.

FIG. 2 is a schematic diagram showing the building entrance device 10B provided with a touch operable aerial display 100. As shown in FIG. 2, the building entrance device 10B includes a touch operable aerial display 100 capable of displaying an aerial image G toward the visitor W, and a control unit 110 that controls the operation of the touch operable aerial display 100.

The touch operable aerial display 100 includes a display device 101, an optical member 102, and a detection unit 103.

The display device 101 is configured to emit light P for generating an aerial image G. The display device 101 is configured as a light source (e.g., LED (Light Emitting Diode)), a lens unit, a liquid crystal display, or the like. The display device 101 is communicably connected to a control unit 110. The aerial image G is formed in a rectangular shape (see FIG. 7), for example.

The optical member 102 is a member that reflects and transmits the light P emitted from the display device 101, and forms an image, in a predetermined space, of an aerial image G that is displayed toward the visitor W. The light emitted from the display device 101 is reflected and transmitted by the optical member 102, and is focused at a position in plane symmetry with the optical member 102. The focused light diverges again, and is observed by the visitor W in an upper space of the touch operable aerial display 100 as the aerial image G.

The detection unit 103 detects an operation input of the visitor W with respect to the aerial image G. The detection unit 103 is configured as a three-dimensional distance sensor that is capable of measuring a distance to an object in space. The detection unit 103 is communicatively connected to the control unit 110.

A control unit 110 controls the display device 101 and the detection unit 103 of the touch operable aerial display 100. For example, the control unit 110 judges to spatial position and a motion of a fingertip of the visitor W based on the information acquired by the detection unit 103. Furthermore, the control unit 110 changes a display content of the aerial image G generated by the light P emitted from the display device 101 according to an operation input to the aerial image G from the visitor W. Furthermore, the control unit 110 changes a display position, a display angle, a display mode, or the like of the aerial image G generated by the light P emitted from the display device 101 according to the visitor W who operates the aerial image G.

First Embodiment

Figure 3:
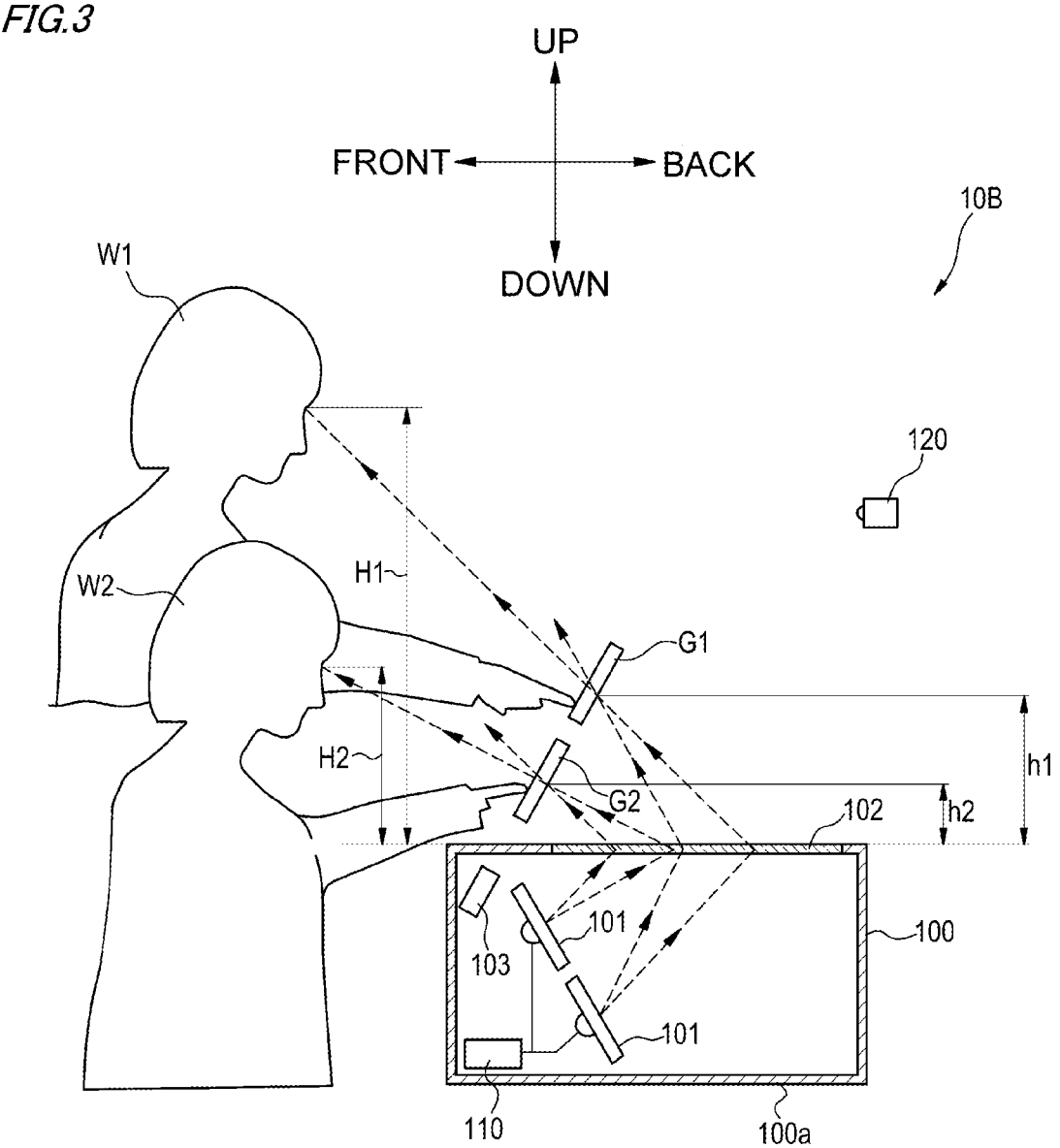
FIG. 3 is a diagram showing an example of a touch operable aerial display provided by the intercom device according to the first embodiment.

FIG. 3 is a diagram showing the touch operable aerial display 100 of the building entrance device 10B in the intercom device 1 according to a first embodiment. As shown in FIG. 3, the building entrance device 10B is provided with a camera 120 (an example of a sensor) for capturing an image of a visitor W who is on the front side of the touch operable aerial display 100. The camera 120 is arranged at a position capable of capturing an image of the face of the visitor W. For example, the camera 120 is provided in a space above the rear side of the touch operable aerial display 100.

The intercom device 1 according to the first embodiment operates as follows, for example.

The camera 120 captures an image of the visitor W, and detects a height of an eye level of the visitor W from a captured face image of the visitor W. The camera 120 transmits the detected eye level information of the visitor W to the control unit 110.

The control unit 110 determines a display position of the aerial image G to be displayed to the visitor W based on the received eye level information of the visitor W. The control unit 110 compares the height of the eye level of the visitor W with a predetermined threshold value, and determines the display position of the aerial image G based on the comparison result. When the height of the eye level of the visitor W is equal to or higher than a predetermined threshold value, the control unit 110 increases the display position of the aerial image G as compared with a case in which the height of the eye level is lower than the predetermined threshold value.

For example, in a case of the visitor W1, the control unit 110 compares the height H1 of the eye level of the visitor W1 with a predetermined threshold value. When the height H1 of the eye level is equal to or higher than the predetermined threshold value, the control unit 110 displays the display position of the aerial image G1 to be displayed to the visitor W1 at the position of the height h1. Furthermore, in a case of the visitor W2, the control unit 110 compares the height H2 of the eye level of the visitor W2 with a predetermined threshold value. When the height H2 of the eye level is lower than the predetermined threshold value, the control unit 110 displays the display position of the aerial image G2 to be displayed to the visitor W2 at the position of the height h2. It should be noted that a reference position of the height is assumed to be the position of the optical member 102.

The control unit 110 sets the height h1 of the display position of the aerial image G1 to be displayed for the visitor W1 whose height of the eye level H1 is equal to or higher than a predetermined threshold value, to be higher than the height h2 of the display position of the aerial image G2 to be displayed for the visitor W2 whose height of the eye level H2 is lower than the predetermined threshold value.

The control unit 110 changes the position and the angle of the display device 101 within the housing 100a of the touch operable aerial display 100, so as to change the display position at which the aerial image G is displayed to a predetermined display position. Specifically, the control unit 110 changes a facing position and a facing angle of the display device 101 with respect to the optical member 102, so as to change the display position of the aerial image G. For example, in a case in which the aerial image G2 is displayed at a position lower than the aerial image G1, the position of the display device 101 in the housing 100a may be set to a position that is higher than that of the display device 101 in a case in which the aerial image G1 is displayed. With this, in a case in which the aerial image G2 is displayed, an incident angle of the light P emitted from the display device 101 with respect to the optical member 102 is set to an acute angle than in a case in which the aerial image G1 is displayed. This allows the aerial image G2 to be displayed at a position that is lower than the aerial image G1.

As described above, the intercom device 1 of the first embodiment includes the building entrance device 10B (an example of an entrance slave apparatus) for the visitor W to call and talk to the resident, and the living room master device 30 for the resident to respond to a call from the building entrance device 10B. The building entrance device 10B includes the touch operable aerial display 100 for displaying the aerial image G toward the visitor W, and the control unit 110 for changing the display position of the aerial image G. The touch operable aerial display 100 includes the display device 101 for emitting light for generating the aerial image G, the optical member 102 for reflecting and transmitting the light so as to form an image of the aerial image G in a predetermined space, and the detection unit 103 for detecting an operation input of the visitor W with respect to the aerial image G. With this configuration, a display position of the aerial image G used as the operation acceptance unit of the building entrance device 10B can be changed. This provides the building entrance device 10B provided with the touch operable aerial display 100 with greatly improved operability.

Furthermore, the intercom device 1 further includes the camera 120 arranged in a predetermined space so as to be capable of detecting the heights H1 and H2 of the eye level of the visitor W. Subsequently, the control unit 110 changes the display position of the aerial image G based on the heights H1 and H2 of the eye level of the visitor W detected by the camera 120. Specifically, when the heights H1 and H2 of the eye level of the visitor W are equal to or higher than a predetermined threshold value, the control unit 110 increases the display position of the aerial image G as compared with a case in which the heights H1 and H2 of the eye level are lower than the predetermined threshold value. As described above, by changing the display position of the aerial image G according to the heights H1 and H2 of the eye level of the visitor W, for example, even in a case in which the visitor W is a person (e.g., a child) having a height that is lower than normal or a person (e.g., a foreigner) having a height that is higher than normal, the operability of the building entrance device 10B provided with the touch operable aerial display 100 is not impaired. Accordingly, this arrangement is capable of providing high-quality operability to any visitor W.

It should be noted that, in the first embodiment, an example has been described in which the camera 120 is installed in the upper space on the rear side of the touch operable aerial display 100. However, the present invention is not restricted to this arrangement. For example, the camera 120 may be configured to be installed in the housing of the touch operable aerial display 100. Also, in a case in which the contact-type building entrance device 10A provided with a stationary hardware device is provided in parallel with the touch operable aerial display 100, a camera that is common to the camera 13 provided in the building entrance device 10A may be used.

(Modification)

Figure 4:
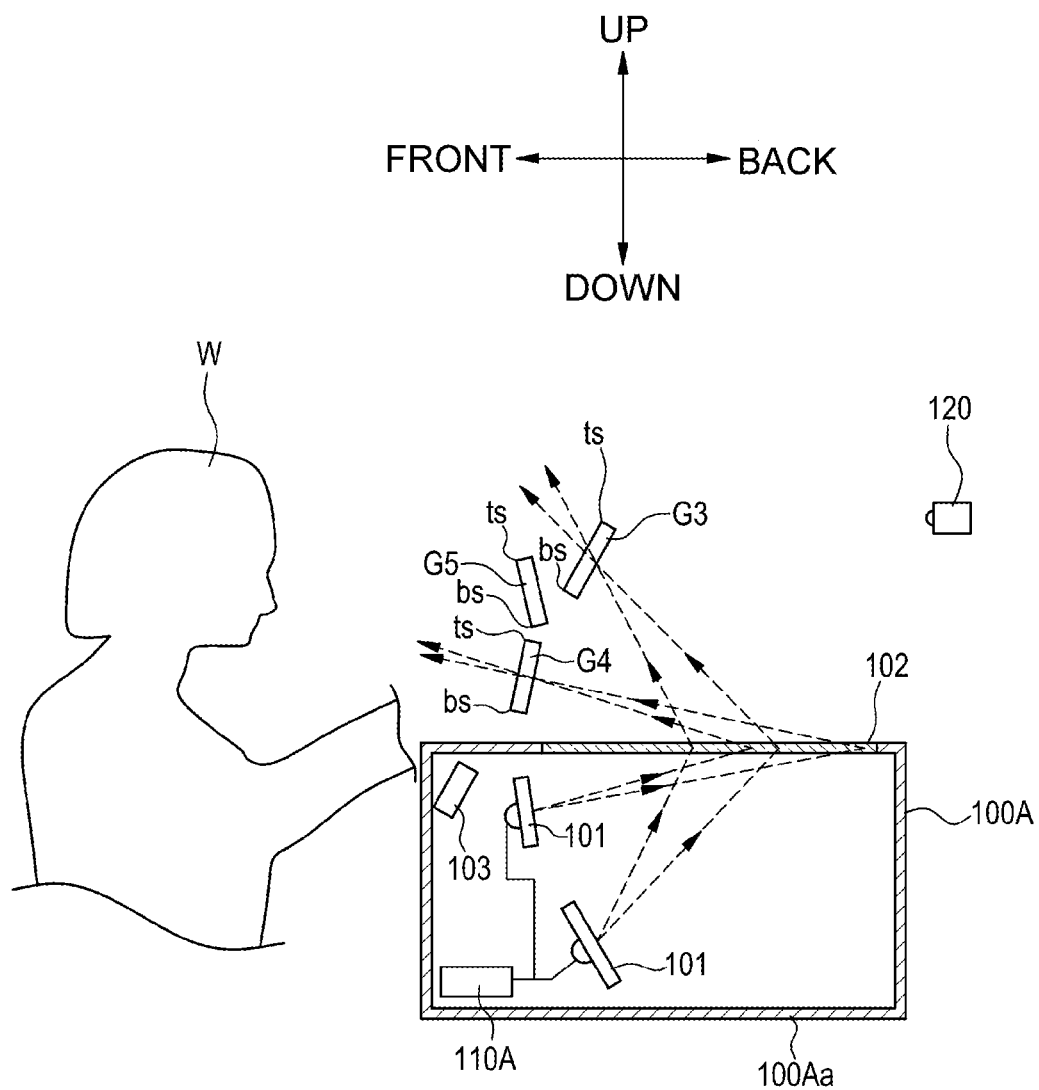
FIG. 4 is a diagram showing a modification of the touch operable aerial display shown in FIG. 3.

FIG. 4 is a diagram showing a modification of the touch operable aerial display 100 shown in FIG. 3. The operation of the intercom device 1 provided with the touch operable aerial display 100A according to the modification is described as follows, for example.

The camera 120 captures an image of the visitor W, and detects a height of an eye level of the visitor W from a captured face image of the visitor W. The camera 120 transmits the detected eye level information of the visitor W to the control unit 110A.

The control unit 110A determines the display angle of the aerial image G to be displayed to the visitor W based on the received eye level information of the visitor W. For example, the control unit 110A compares the height of the eye level of the visitor W with a predetermined threshold value, and determines the display angle of the aerial image G based on the comparison result.

When the height of the eye level of the visitor W is higher than the predetermined threshold value, the control unit 110A sets the display angle of the aerial image G3 so that a lower side bs of the rectangular aerial image G3 is inclined in a direction approaching the visitor W than an upper side ts of the aerial image G3, for example. Also, when the height of the eye level of the visitor W is higher than the predetermined threshold value, the control unit 110A may set the display angle of the aerial image G3 so that an image plane of the aerial image G3 is substantially perpendicular to a front-rear direction of the touch operable aerial display 100A. It should be noted that the side at which the visitor W faces the touch operable aerial display 100A is referred to as the front side of the touch operable aerial display 100A.

For example, when the height of the eye level of the visitor W is high (i.e., when the visitor W is tall), the display angle of the aerial image G3 may be set so as to increase an elevation angle of the image plane as shown in the aerial image G3. When the height of the eye level of the visitor W is low (i.e., when the visitor W is small), the display angle of the aerial image G4 may be set so that the elevation angle of the image plane is smaller than that of the aerial image G3 as shown in the aerial image G4.

Also, when the height of the eye level of the visitor W is equal to or lower than a predetermined threshold value, the control unit 110A may set the display angle of the aerial image G5 so that an upper side ts of the rectangular aerial image G5 is inclined in a direction closer to the visitor W than a lower side bs of the aerial image G5 as shown in FIG. 4 as an aerial image G5.

The control unit 110A changes the position and the angle of the display device 101 within the housing 100a of the touch operable aerial display 100, so as to change the display angle, at which the aerial image G is displayed, to a predetermined display angle. Specifically, the control unit 110A changes the display angle of the aerial image G by changing the facing position and the facing angle of the display device 101 with respect to the optical member 102. For example, in a case in which the aerial image G4 is displayed, the position of the display device 101 in the housing 100a may be set to a position that is higher than that of the display device 101 in a case in which the aerial image G3 is displayed, and the angle of the display device 101 may be changed. With this configuration, in a case in which the aerial image G4 is displayed, the incident angle of the light P emitted from the display device 101 with respect to the optical member 102 is set to an acute angle than in a case in which the aerial image G3 is displayed. Accordingly, the aerial image G4 can be displayed such that the position is lower than the aerial image G3 and the elevation angle of the image plane is smaller than that of the aerial image G3.

As described above, with the intercom device 1 provided with the touch operable aerial display 100A according to the modification, the building entrance device 10B is provided with the touch operable aerial display 100A for displaying the aerial image G toward the visitor W, and the control unit 110A for changing the display angle of the aerial image G. With this configuration, the display angle of the aerial image G used as the operation acceptance unit of the building entrance device 10B can be changed. Accordingly, the operability of the building entrance device 10B provided with the touch operable aerial display 100A is greatly improved.

Furthermore, with the intercom device 1 provided with the touch operable aerial display 100A according to the modification, the display angle of the aerial image G can be changed according to the height of the eye level of the visitor W detected by the camera 120. Specifically, in a case in which the height of the eye level of the visitor W is equal to or lower than a predetermined threshold value, the display angle can be changed so that the upper side ts of the rectangular aerial image G is inclined in a direction closer to the visitor W than the lower side bs. Accordingly, for example, in a case in which the visitor W is a person (e.g., a child) having a height that is lower than normal, this does not impair the operability of the building entrance device 10B.

Furthermore, with the intercom device 1 provided with the touch operable aerial display 100A according to the modification, when the height of the eye level of the visitor W is higher than a predetermined threshold value, the display angle is changed so that the aerial image G becomes vertical or so that the lower side bs is inclined in a direction approaching the visitor W than the upper side ts. With this, when a person who is normal height or is taller than the normal height operates the touch operable aerial display 100A, the aerial image G is displayed at the same angle as that of an operation unit of a conventional building entrance device 10A as a stationary hardware device. Accordingly, the touch operable aerial display 100A can be operated without any discomfort.

Second Embodiment

Figure 5:
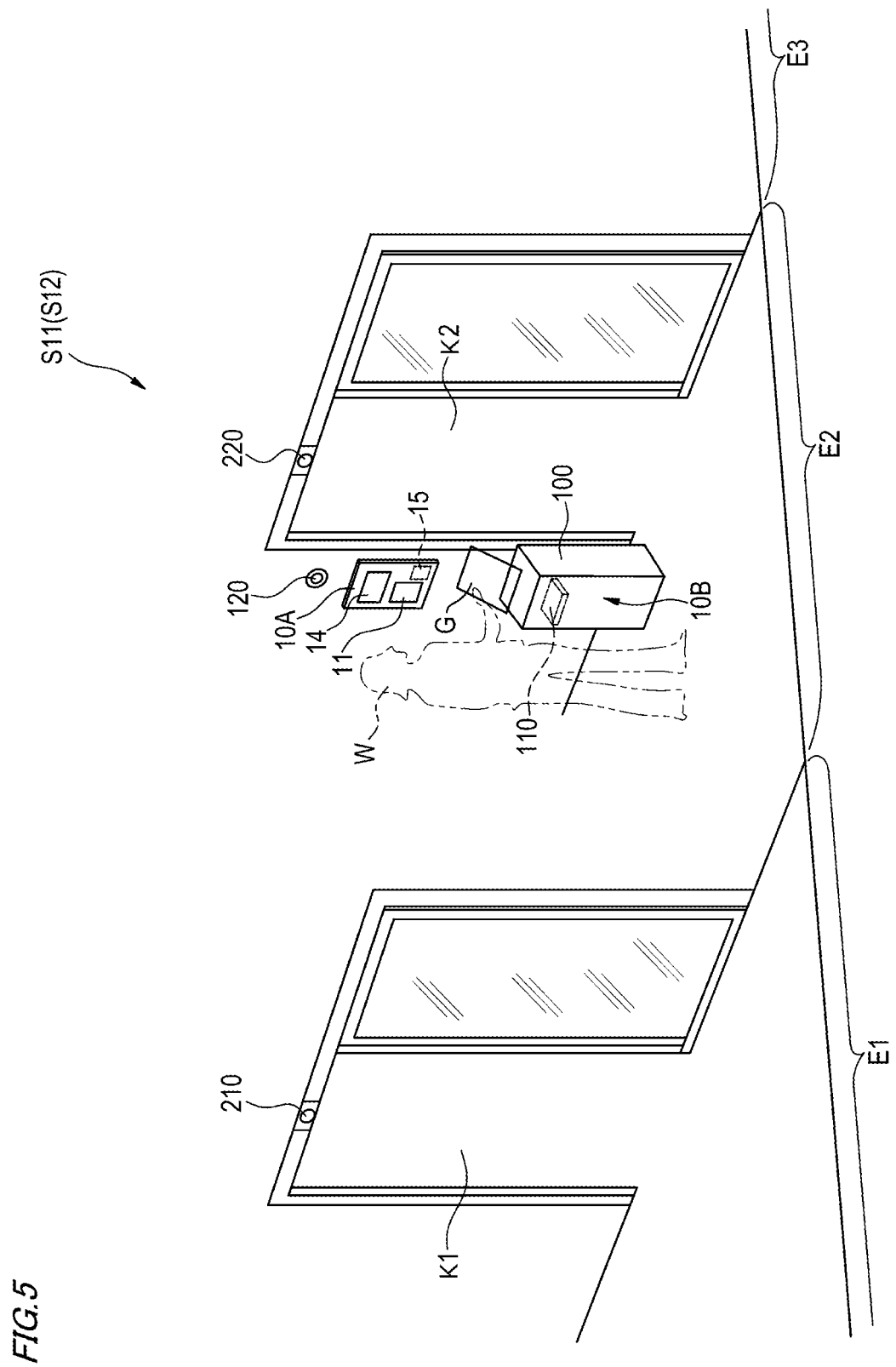
FIG. 5 is a schematic diagram showing an intercom system on which the intercom device according to the second embodiment and the third embodiment is mounted.

FIG. 5 is a schematic diagram showing a control system S11 for controlling the intercom device 1 according to the second embodiment. The control system S11 is used in an intercom system on which the intercom device 1 is mounted. As shown in FIG. 5, the control system S11 includes a building entrance device 10A (an example of a hardware device), a building entrance device 10B, a camera 120, a living room master device 30 (see FIG. 1), and a control device 40 (see FIG. 1).

As described with reference to FIG. 1, the building entrance device 10A includes an operation unit 11 serving as an operation acceptance unit. It should be noted that, in a case in which the display unit 14 of the building entrance device 10A is configured as a touch display, the display unit 14 functions as an operation acceptance unit. Furthermore, the building entrance device 10A includes a control unit 15 that controls the operation of the building entrance device 10A.

As described with reference to FIG. 2, the building entrance device 10B includes a touch operable aerial display 100 and a control unit 110. The touch operable aerial display 100 includes a display device 101, an optical member 102, and a detection unit 103, and displays an aerial image G toward a visitor W (an example of a user). The control unit 110 controls the operation of the touch operable aerial display 100. Furthermore, the control unit 110 is communicably connected to the control unit 15 of the building entrance device 10A via an intercom line L1.

The camera 120 is configured to detect the visitor W and to be capable of capturing an image of the detected visitor W. In the present embodiment, the building entrance device 10A and the building entrance device 10B are provided in parallel. Accordingly, a single camera 120 is provided as a common camera for both the building entrance devices 10A and 10B. The camera 120 is communicably connected to the building entrance device 10A and the building entrance device 10B. It should be noted that, in a case in which the building entrance device 10A and the building entrance device 10B are provided in parallel, for example, the camera 13 provided in the building entrance device 10A may be used as a camera for sharing both the building entrance devices.

As described above with reference to FIG. 1, the living room master device 30 (an example of a calling device) is a device that is capable of being called based on a calling operation from the building entrance device 10A or the building entrance device 10B.

As described with reference to FIG. 1, the control device 40 is connected to the building entrance device 10 and the living room master device 30, and controls communication between the building entrance device 10 and the living room master device 30. The control device 40 executes a call processing for calling the living room master device 30 based on a call signal received from the control unit 15 of the building entrance device 10A and the control unit 110 of the building entrance device 10B when a call operation is input to the building entrance device 10A and the building entrance device 10B.

Figure 6:
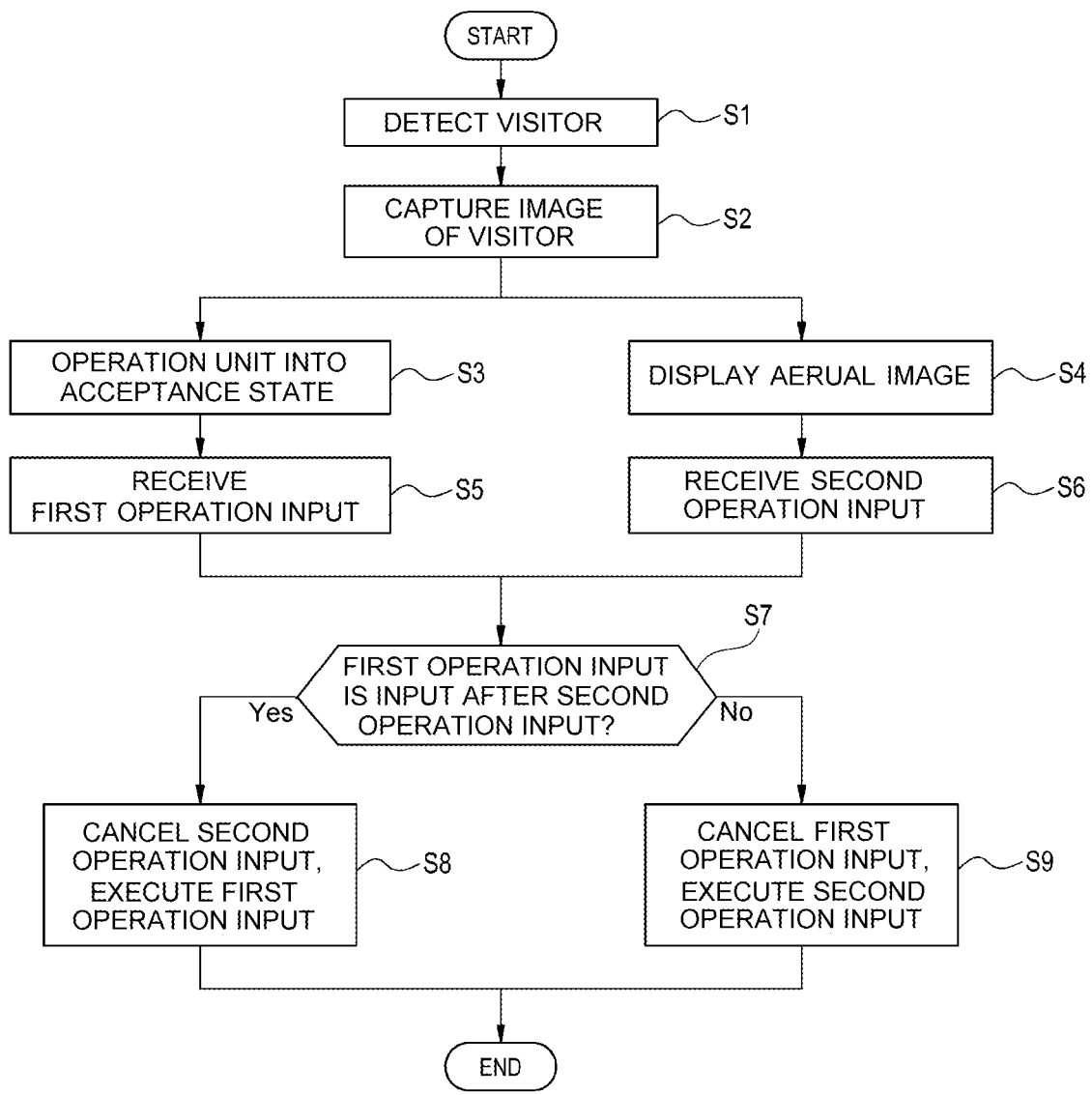
FIG. 6 is a flowchart showing an example of the operation of a control system of an intercom device according to a second embodiment.

Description will be made with reference to FIG. 6 regarding an example of the operation of the control system S11 having such a configuration.

First, the control system S11 uses the camera 120 to detect the visitor W (Step S1). The camera 120 starts capturing an image of the detected visitor W (Step S2). Furthermore, the camera 120 transmits a detection signal for notifying the detection of the visitor W to the building entrance device 10A and the building entrance device 10B.

Next, the control unit 15 of the building entrance device 10A switches from the standby state to the driving state based on the received detection signal, displays a predetermined image on the display unit 14, and sets the operation unit 11 to the acceptance state in which the operation is possible (Step S3). The control unit 110 of the building entrance device 10B switches from the standby state to the driving state based on the received detection signal, and starts the display of the aerial image G (Step S4). With this, the building entrance device 10A and the building entrance device 10B enter the input waiting state for waiting for the operation input from the visitor W.

Next, description will be made assuming that, for example, the operation unit 11 of the building entrance device 10A receives the first operation input of the visitor W, and further, that the aerial image G of the building entrance device 10B also receives the second operation input of the visitor W. In this case, the control unit 15 of the building entrance device 10A receives the first operation input (Step S5). The control unit 110 of the building entrance device 10B receives the second operation input (Step S6). The control unit 15 and the control unit 110 transmit and receive the received reception information to each other, and judge the operation input that is the later accepted one from among the first operation input and the second operation input. Specifically, the control unit 15 and the control unit 110 judge whether or not the first operation input is received after the second operation input (Step S7).

When it is judged that the first operation input is received later than the second operation input (Yes in Step S7), the control unit 15 and the control unit 110 cancel the processing based on the second operation input received first, and execute the processing based on the first operation input received later (Step S8). On the other hand, when it is determined that the first operation input is not received after the second operation input (No in Step S7), the control unit 15 and the control unit 110 cancel the processing based on the first operation input received first, and execute the processing based on the second operation input received later (Step S9).

For example, description will be made assuming that the visitor W first provides the second operation input to the aerial image G of the building entrance device 10B. However, since it becomes difficult to understand the operation method in the middle of the operation, the second operation input is stopped, and the first operation input to the operation unit 11 of the building entrance device 10A is provided. In this case, the control unit 15 and the control unit 110 cancel the first processing based on the second operation input to the building entrance device 10B, and execute the later processing based on the first operation input to the building entrance device 10A.

For example, description will be made assuming that the visitor W first starts the first operation input to the operation unit 11 of the building entrance device 10A. However, in the middle of the operation, the contact operation to the operation unit 11 is stopped so as to provide the second operation input to the aerial image G of the building entrance device 10B. In this case, the control unit 15 and the control unit 110 cancel the processing based on the first operation input executed first to the building entrance device 10A. The control unit 15 and the control unit 110 execute the processing based on the second operation input executed later to the building entrance device 10B.

Also, the control system S11 may operate as follows, for example.

First, as in the example described above, the building entrance device 10A displays a predetermined image on the display unit 14 based on a detection signal received from the camera 120, and switches the operation unit 11 to a reception state in which it is operable. The building entrance device 10B starts displaying the aerial image G based on a detection signal received from the camera 120.

Next, for example, description will be made assuming that either one operation input of the first operation input of the visitor W to the operation unit 11 of the building entrance device 10A and the second operation input of the visitor W to the aerial image G of the building entrance device 10B is received, and the call processing of the living room master device 30 that corresponds to the operation input thereof is started. Description will be made assuming that, after the call processing is started, the other one operation input of the first operation input of the visitor W to the operation unit 11 of the building entrance device 10A and the second operation input of the visitor W to the aerial image G of the building entrance device 10B is received. In this case, the control unit 15 of the building entrance device 10A and the control unit 110 of the building entrance device 10B transmit and receive the reception information of the operation input received by each of the first and second operation inputs. The control unit 15 and the control unit 110 judge the operation input of the first acceptance from among the first operation input and the second operation input. Furthermore, the control unit 15 and the control unit 110 confirm that the call processing of the living room master device 30 that corresponds to the former operation input is started. The control unit 15 and the control unit 110 stop receiving the other operation input (later operation input) based on the determination result and the confirmation result, and execute the processing (processing after the call processing) based on the one operation input (former operation input).

For example, the visitor W first made the second operation input to the aerial image G of the building entrance device 10B, and the call processing for the living room master device 30 that corresponds to the second operation input was started. However, description will be made assuming that, after the call processing is started, the visitor W becomes worried that the operation thereof is not correct, and thus the first operation input to the operation unit 11 of the building entrance device 10A was started. In this case, the control unit 15 and the control unit 110 do not receive the later-started first operation input to the building entrance device 10A. Instead, the control unit 15 and the control unit 110 continuously execute the call processing based on the former-started second operation input to the building entrance device 10B.

The same can be said of a case in which the second operation input to the aerial image G of the building entrance device 10B and the first operation input to the operation unit 11 of the building entrance device 10A are in the reverse order. That is to say, when the call processing based on the former operation input of the building entrance device is started, the later operation input to the building entrance device is not accepted.

As described above, the control system S11 for controlling the intercom device 1 of the second embodiment includes the building entrance device 10A (hardware device) including the operation unit 11, the touch operable aerial display 100 (the building entrance device 10B) including the display device 101 for displaying the aerial image G, the optical member 102, and the detection unit 103, the control unit 15 for controlling the building entrance device 10A, and the control unit 110 for controlling the touch operable aerial display 100. Then, when the control units 15,110 receive both the first operation input of the visitor W with respect to the operation unit 11 and the second operation input of the visitor W with respect to the aerial image G, the control units 15,110 cancel the processing based on the first received operation input from among the first operation input and the second operation input, and execute the processing based on the later received operation input. With this configuration, even in a case in which the operation input to the contact-type building entrance device 10A, which is a hardware device, is mixed with the operation input to the non-contact-type building entrance device 10B, which touches an aerial image, priority is given to the later operation input. This provides improved control quality of the intercom device 1 in which the hardware device and the aerial image coexist.

Furthermore, the control system S11 that controls the intercom device 1 of the second embodiment further includes a camera 120 (an example of a sensor) that detects the visitor W. Subsequently, the control unit 110 starts the display of the aerial image G when the camera 120 detects the visitor W. With this configuration, the aerial image G is displayed only in a case in which the visitor W exists. Accordingly, the load on the control system S11 can be reduced, and the power consumption of the touch operable aerial display 100 can be reduced.

Furthermore, the control system S11 for controlling the intercom device 1 of the second embodiment further includes a living room master device 30 that is capable of being called by receiving a first operation input to the operation unit 11 of the building entrance device 10A or a second operation input to the aerial image G of the building entrance device 10B. Subsequently, when the other one of the first operation input and the second operation input is received after the control unit 15,110 starts the call processing of the living room master device 30 by receiving one of the first operation input and the second operation input, the control units 15,110 execute the processing based on the one operation input without receiving the other operation input. In a case in which the other operation input is made after the call processing of the living room master device 30 is started by the one operation input, if the other operation input is prioritized, there is a possibility that the call destination is confused so that appropriate control cannot be executed. In contrast, with the above configuration, after call processing by one operation input is started, the processing is cancelled without receiving the other operation input. Furthermore, the processing based on the one operation input is continued. This allows the control quality to be maintained without causing confusion of the call destination.

It should be noted that, in the second embodiment, description has been made regarding a case in which the control system S11 is used for an intercom system. However, the present invention is not restricted to such a case. For example, the control system S11 may be used in a nurse call system. In this case, a conventional nurse call master device installed in a nurse station corresponds to a contact-type hardware device. Then, a touch operable aerial display for displaying the aerial image G toward the medical professional is provided in conjunction with a conventional nurse call master device at a nurse station. Also, a nurse call slave unit which is used by a patient to call a nurse or to receive a call from a nurse call master device corresponds to a calling device.

Third Embodiment

Next, with reference to FIG. 5 again, description will be made regarding the intercom system S12 on which the intercom device 1 according to the third embodiment is mounted. As shown in FIG. 5, the intercom device 1 in the intercom system S12 includes a contact-type building entrance device 10A provided with a stationary hardware device, a non-contact-type building entrance device 10B to be touched on the aerial image G, a camera 120, and a living room master device 30 (see FIG. 1).

The building entrance device 10A includes an operation unit 11, a display unit 14, and a control unit 15 as with the configuration described in the second embodiment.

The building entrance device 10B includes a first sensor 210 and a second sensor 220 in addition to the touch operable aerial display 100 and the control unit 110 configured as described in the above-described second embodiment. The first sensor 210 and the second sensor 220 are communicatively connected to the control unit 110. The touch operable aerial display 100 includes a display device 101, an optical member 102, and a detection unit 103, and displays an aerial image G toward the visitor W. The control unit 110 controls the operation of the touch operable aerial display 100.

The first sensor 210 detects an opening and closing operation of the first entrance K1 of the apartment complex M. The first sensor 210 detects the opening and closing operation of the first entrance K1, thereby detecting that the visitor W has passed through the first entrance K1. The second sensor 220 detects the opening and closing operations of the second entrance K2 of the apartment complex M. The second sensor 220 detects the opening and closing operation of the second entrance K2, thereby detecting that the visitor W has passed through the second entrance K2. The first entrance K1 and the second entrance K2 are automatic doors that detect the presence or absence of the visitor W and that open or close the door.

The building entrance device 10A and the building entrance device 10B are installed in a building entrance E2 provided between the first entrance K1 and the second entrance K2 of the apartment complex M. The first sensor 210 is disposed in the vicinity of a first entrance K1 provided between the building entrance E2 and the outside E1. The second sensor 220 is disposed in the vicinity of a second entrance K2 provided between the building entrance E2 and the residential area E3.

As described in the second embodiment, the camera 120 detects the visitor W and captures an image of the detected visitor W. As described in the above-described second embodiment, the living room master device 30 is a device that is capable of being called based on a call operation from the building entrance device 10A or the building entrance device 10B.

The intercom device 1 in the intercom system S12 operates as follows, for example. When the visitor W, who has visited the apartment complex M, passes through the first entrance K1, the first sensor 210 detects the opening and closing operation of the first entrance K1, and transmits a detection signal indicating the detection to the control unit 110.

The control unit 110 starts the display of the aerial image G toward the visitor W based on the detection signal received from the first sensor 210.

Next, when the visitor W performs a predetermined operation input on the displayed aerial image G, for example, the second entrance K2 is opened. Subsequently, when the visitor W passes through the second entrance K2, the second sensor 220 detects the opening and closing operation of the second entrance K2, and transmits a detection signal indicating the detection to the control unit 110.

The control unit 110 stops the display of the aerial image G based on a detection signal received from the second sensor 220.

As described above, the intercom device 1 of the third embodiment includes a building entrance device 10B configured to allow a visitor W to call and talk to a resident, and a living room master device 30 configured to allow the resident to respond to a call from the building entrance device 10B. The building entrance device 10B includes a touch operable aerial display 100 configured to display an aerial image G toward the visitor W, a control unit 110 configured to control the touch operable aerial display 100, and a first sensor 210 configured to detect the visitor W. The touch operable aerial display 100 includes: a display device 101 configured to emit light for generating the aerial image G; an optical member 102 configured to reflect and transmit the light so as to form an image of the aerial image G in a predetermined space; and a detection unit 103 configured to detect an operation input of the visitor W with respect to the aerial image G. Subsequently, the control unit 110 starts a display of the aerial image G when the first sensor 210 detects the visitor W. With this configuration, the touch operable aerial display 100 is used as the building entrance device 10B. This provides improved operability. Furthermore, the aerial image G is displayed only in a case in which the visitor W exists. This allows the power consumption of the touch operable aerial display 100 to be reduced.

Furthermore, with the intercom device 1 of the third embodiment, the first sensor 210 is disposed in the vicinity of a first entrance K1 provided between a building entrance E2 in which the building entrance device 10B is installed and an outside E1. Subsequently, the control unit 110 starts the display of the aerial image G based on the detection of the opening and closing of the first entrance K1 by the first sensor 210. This allows the timing of starting the display of the aerial image G due to the arrival of the visitor W to be controlled with a simple configuration.

Furthermore, the intercom device 1 according to the third embodiment further includes a second sensor 220 arranged in the vicinity of a second entrance K2 provided between the building entrance E2 and a residential area E3. Then, the control unit 110 stops the display of the aerial image G based on the detection of the opening and closing of the second entrance K2 by the second sensor 220. With this configuration, the display of the aerial image G is suspended based on the fact that the visitor W has finished the operation of the touch operable aerial display 100 on the aerial image G. This provides a further improved effect of reducing the power consumption of the touch operable aerial display 100.

Fourth Embodiment

Figure 7:
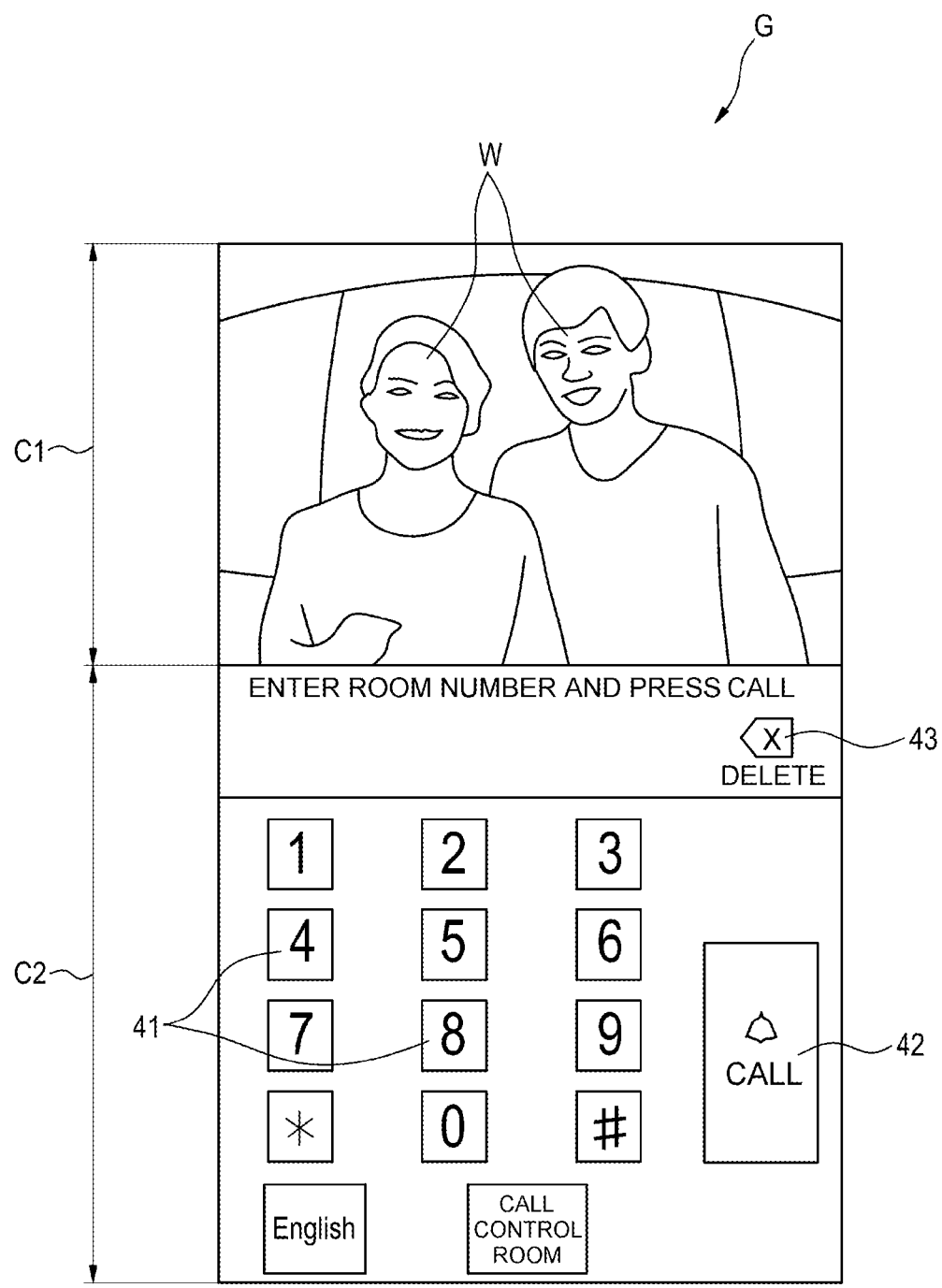
FIG. 7 is a diagram showing an example of an aerial image displayed by a touch operable aerial display of an intercom device according to a fourth embodiment.
Figure 8:
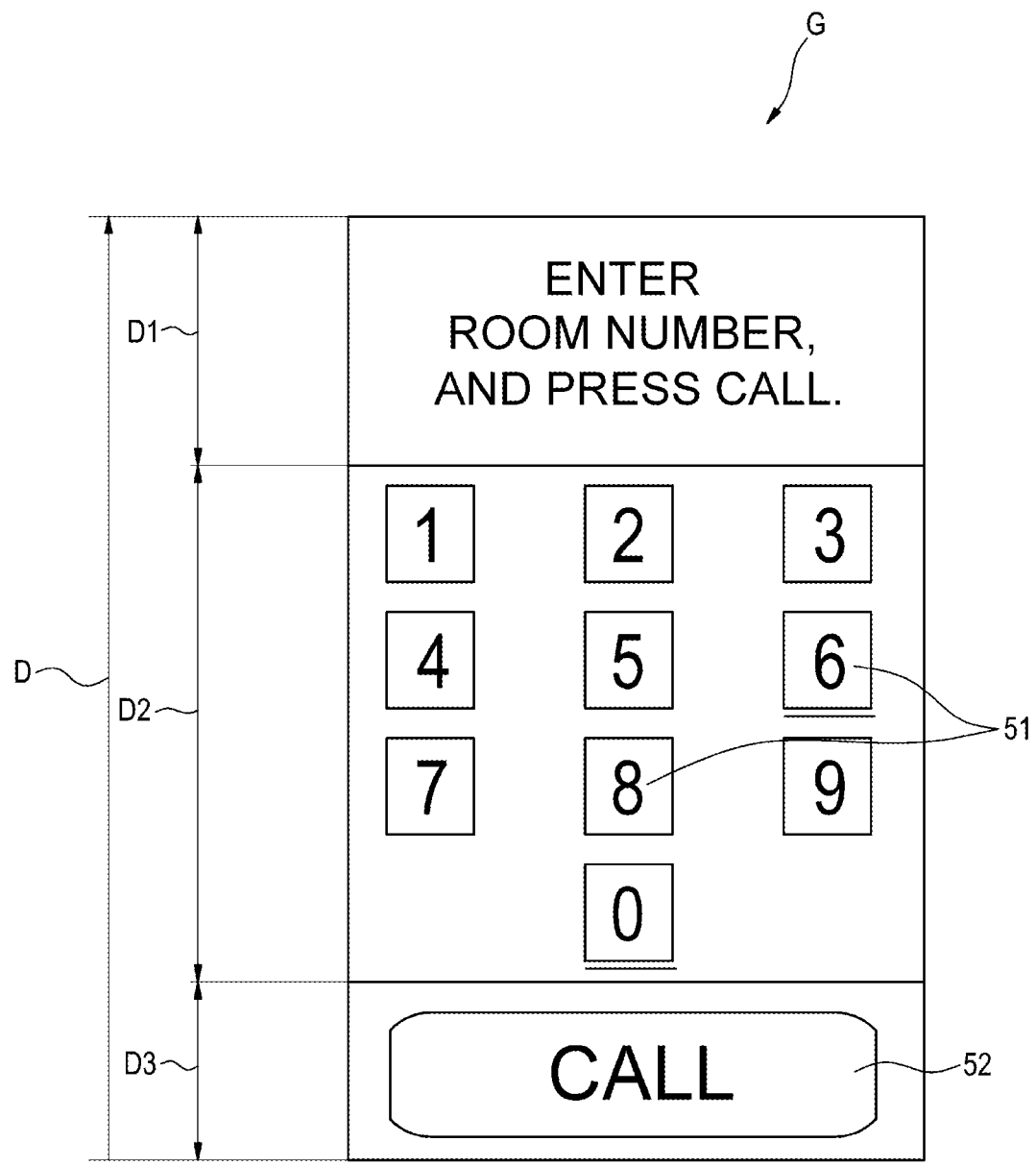
FIG. 8 is a diagram showing another example of an aerial image shown in FIG. 7.
Figure 9:
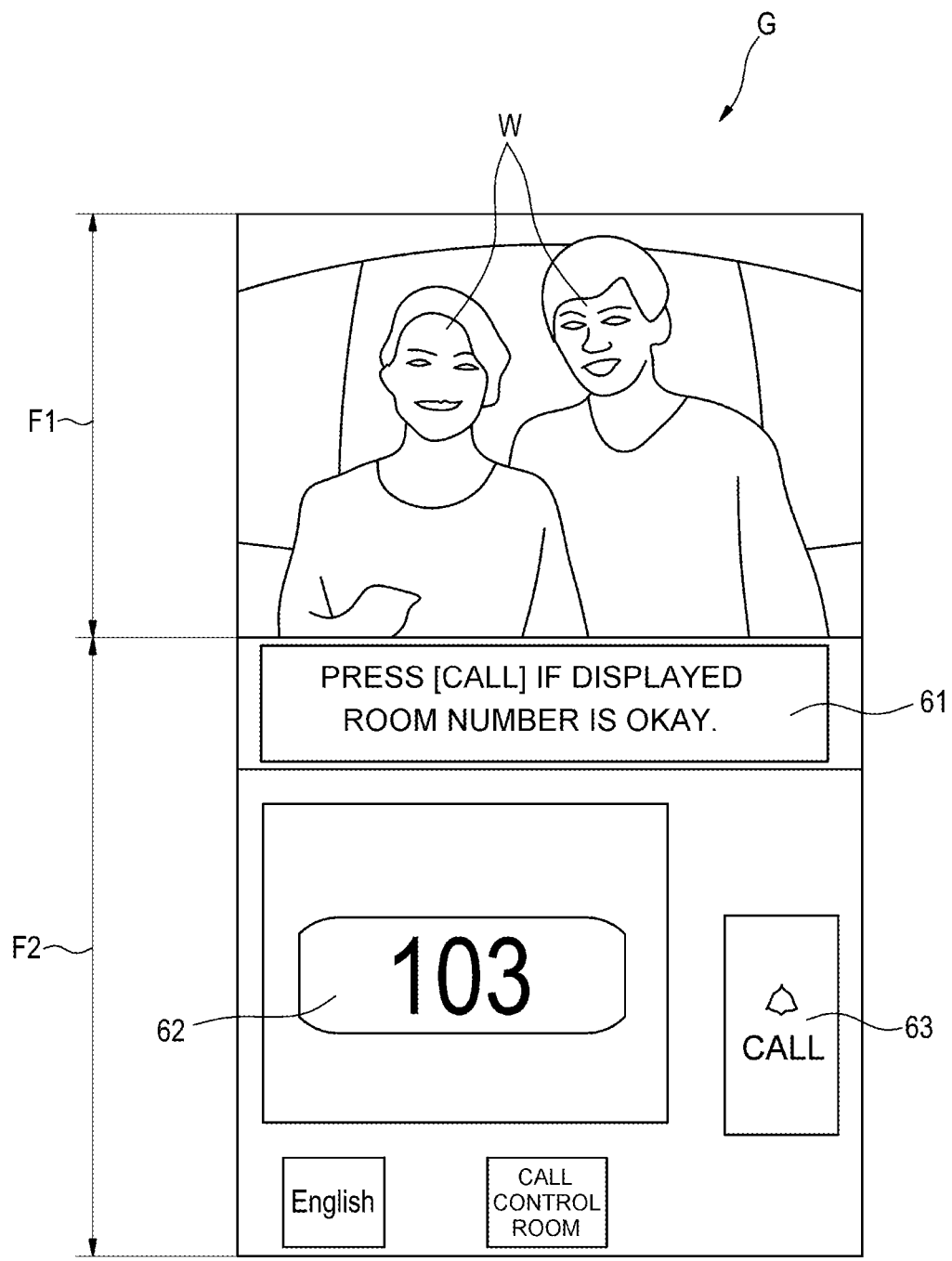
FIG. 9 is a diagram showing further another example of an aerial image shown in FIG. 7.

With reference to FIG. 7 through FIG. 9, description will be made regarding an example of an aerial image displayed by the touch operable aerial display 100 of the building entrance device 10B of the intercom device 1 according to a fourth embodiment.

The building entrance device 10B is provided with a camera 120 for capturing an image of a visitor W who is on the front side of the touch operable aerial display 100. The camera 120 is configured to be capable of detecting an attribute of the visitor W based on an image of the visitor W thus captured. The attributes of the visitor W include, for example, the height or the age of the visitor W, and whether or not the visitor W is a person associated with the apartment complex M. A face image of a person associated with the apartment complex M is captured beforehand, and is registered in the building entrance device 10B. Examples of the associated person may include a resident of the apartment complex M, a relative of the resident, a friend, etc. As described in the first embodiment, the camera 120 is provided in a space above the rear side of the touch operable aerial display 100, for example.

FIG. 7 shows the first display mode of the aerial image G displayed by the touch operable aerial display 100. As shown in FIG. 7, the aerial image G in the first display mode is provided with a visitor image display unit C1 and a call operation acceptance unit C2. The visitor image display unit C1 displays a face image of the visitor W captured by the camera 120. The call operation acceptance unit C2 displays a numeric keypad 41 for inputting a room number to be called, a call button 42 to be pressed after the room number is input, a cancel button 43 capable of canceling the input number, or the like.

FIG. 8 shows the second display mode of the aerial image G displayed by the touch operable aerial display 100. As shown in FIG. 8, the aerial image G in the second display mode includes a call operation acceptance unit D for all the regions. The call operation acceptance unit D is provided with an operation message unit D1 on which the operation content of the aerial image G is displayed, a first operation unit D2 on which a numeric keypad 51 for inputting a room number to be called is displayed, and a second operation unit D3 on which a call button 52 to be pressed after the room number is input is displayed. The second display mode is a mode in which the display mode is simpler than the first display mode shown in the call operation acceptance unit C2 shown in FIG. 7. The second display mode is, for example, a mode in which the number of operation buttons included in the call operation acceptance unit D is smaller than that in the first display mode, and the size of the operation buttons is larger. Furthermore, the second display mode is a mode in which the display characters are configured as Japanese cursive characters (Hiragana) alone.

FIG. 9 shows a third display mode of the aerial image G displayed by the touch operable aerial display 100. As shown in FIG. 9, the aerial image G in the third display mode includes a visitor image display unit F1 and a call operation acceptance unit F2. The visitor image display unit F1 displays a face image of the visitor W captured by the camera 120. The call operation acceptance unit F2 displays an operation message 61 indicating the operation contents of the aerial image G, a room number 62 indicating the visit destination in the apartment complex M selected on the touch operable aerial display 100 side, a call button 63 for calling the selected room number, or the like. The third display mode is a mode displayed when it is judged that the visitor W is a person associated with the apartment complex M. In the third display mode, for example, the input operation step of the room number is omitted in order to enhance the operability of the call input to the associated visitor W.

The touch operable aerial display 100 of the intercom device 1 according to the fourth embodiment operates as follows, for example.

The camera 120 captures an image of the visitor W, and detects the height and the age of the visitor W from the captured face image of the visitor W. The camera 120 transmits attribute information such as the detected height, age, and the like of the visitor W to the control unit 110.

The control unit 110 judges whether or not the height or the age of the visitor W is equal to or larger than a predetermined threshold value based on the attribute information of the visitor W received from the camera 120. When the control unit 110 judges that the height or the age of the visitor W is equal to or larger than a predetermined threshold value, as shown in FIG. 7, the control unit 110 displays a first display mode in which the numeric keypad 41, the call button 42, the cancel button 43, and the like are displayed on the call operation acceptance unit C2 of the aerial image G.

On the other hand, when the control unit 110 judges that the height or the age of the visitor W is lower than a predetermined threshold value, as shown in FIG. 8, the control unit 110 displays a second display mode in which the operation message unit D1, the first operation unit D2, and the second operation unit D3 are provided on the call operation acceptance unit D of the aerial image G. The control unit 110 displays the contents to be operated in the form of the Japanese cursive syllabary on the operation message unit D1, for example, as "Enter the room number and press [CALL]." Then, the first operation unit D2 and the second operation unit D3 display a minimum button capable of executing the operation content.

Also, the touch operable aerial display 100 of the intercom device 1 according to the fourth embodiment may operate as follows, for example.

The camera 120 captures an image of the visitor W, and detects whether or not the visitor W is a person associated with the apartment complex M from the captured face image of the visitor W. The camera 120 transmits the detected attribute information to the control unit 110.

When the control unit 110 recognizes that the visitor W is a person associated with the apartment complex M based on the attribute information of the visitor W received from the camera 120, as shown in FIG. 9, the control unit 110 displays a third display mode in which the operation message 61, the room number 62, the call button 63, or the like are displayed on the call operation acceptance unit F2 of the aerial image G. When the control unit 110 detects that the vehicle is the associated visitor W, the room number related to the visitor W, e.g., is displayed without the input operation of the visitor W. As the operation message 61, for example, "If the displayed room number is acceptable, press [CALL] (call button 63)." is displayed. In this case, when the call button 63 is pressed, for example, when the visitor W is a resident of the apartment complex M, the door of the collective entrance may be unlocked, and when the visitor W is a friend, the call processing to the room number may be started.

On the other hand, when the control unit 110 recognizes that the visitor W is not a person associated with the apartment complex M, as shown in FIG. 7, the control unit 110 displays a first display mode in which the numeric keypad 41, the call button 42, the cancel button 43, and the like are displayed on the call operation acceptance unit C2 of the aerial image G.

Also, for example, when the control unit 110 judges that the height or age of the visitor W is lower than a predetermined threshold value, and that the visitor W is a person associated with the apartment complex M, the control unit 110 may display the room number associated with the visitor W on the first operation unit D2 of the call operation acceptance unit D without an input operation of the visitor W in the aerial image G shown in FIG. 8, and may display a message such as "Please press [CALL]." on the operation message unit D1 in the form of Japanese cursive characters (Hiragana).

As described above, the intercom device 1 according to the fourth embodiment includes the building entrance device 10B configured to allow the visitor W to call and talk to the resident, and the living room master device 30 configured to allow the resident to respond to a call from the building entrance device 10B. The building entrance device 10B includes a touch operable aerial display 100 for displaying an aerial image G toward a visitor W, and a control unit 110 for controlling the touch operable aerial display 100. The touch operable aerial display 100 includes: a display device 101 configured to emit light for generating the aerial image G; an optical member 102 configured to reflect and transmit the light so as to form an image of the aerial image G in a predetermined space; and a detection unit 103 configured to detect an operation input of the visitor W with respect to the aerial image G. Then, the control unit 110 changes the display mode of the call operation acceptance unit C2 included in the aerial image G. With this configuration, the touch operable aerial display 100 used as the building entrance device 10B can change the display mode of the call operation acceptance unit C2 displayed on the aerial image G. This provides the building entrance device 10B with greatly improved operability.

Furthermore, the intercom device 1 of the fourth embodiment further includes a camera 120 (an example of a sensor) arranged in a predetermined space so as to be capable of detecting the attribute of the visitor W. Then, the control unit 110 changes the display mode of the call operation acceptance unit C2 based on the attribute detected by the camera 120. With this configuration, as an attribute of the visitor W, for example, the display mode of the call operation acceptance unit C2 in the aerial image G is changed according to the height or age of the visitor W. This allows the new building entrance device 10B to be provided with high operability for various visitors W.

Furthermore, with the intercom device 1 of the fourth embodiment, the attribute of the visitor W is, for example, at least one from among the height and the age of the visitor W. Then, when the height or the age is equal to or higher than a predetermined threshold value, the control unit 110 displays the call operation acceptance unit C2 in the first display mode. When the height or the age is lower than the predetermined threshold value, the control unit 110 displays the call operation acceptance unit D in the second display mode which is a simpler display mode than the first display mode. With this configuration, for example, when the visitor W is a child, the call operation acceptance unit D is displayed in the second display mode that is the simple display mode. This allows the touch operable aerial display 100 to be easily operated by a child.

Furthermore, with the intercom device 1 of the fourth embodiment, the second display mode includes at least one from a mode for reducing the number of the operation buttons included in the call operation acceptance unit D to the first display mode, and a mode for increasing the size of the operation buttons. This allows the touch operable aerial display 100 to be easily operated by a child.

Furthermore, with the intercom device 1 according to the fourth embodiment, the attribute of the visitor W includes whether or not the visitor W is a person associated with the apartment complex M in which the building entrance device 10B is installed. Then, when the visitor W is a person associated with the apartment complex M, the control unit 110 displays the call operation acceptance unit F2 in a third display mode different from the first display mode. When the visitor W is not a person associated with the apartment complex M, the control unit 110 displays the call operation acceptance unit C2 in the first display mode. With this, for example, the display mode in a case in which the visitor W is a resident is employed in a different manner from that in a case in which the visitor W is not a resident. This allows security to be secured while improving operability.

Furthermore, with the intercom device 1 of the fourth embodiment, the first display mode is a display mode including at least the numeric keypad 41, and the third display mode is a display mode including at least the display of the room number 62 in the apartment complex M to which the visitor W is associated. As described above, in a case in which the visitor W is a resident, relative, friend, or the like, a call button that allows the associated room number 62 to be directly called is displayed in the aerial image G. This provides greatly improved operability.

Also, for example, when the control unit 110 judges that the visitor W is a foreigner based on the attribute information received from the camera 120, the control unit 110 may change the language notation of the call operation acceptance units C2, D, and F2 to a predetermined foreign language. With this configuration, for example, in a case in which there is a high probability that the visitor is a foreign national, the call operation acceptance units C2, D, and F2 are displayed in English instead of Japanese, thereby allowing the touch operable aerial display 100 to be operated with improved operability.

It should be noted that the present disclosure is not restricted to the embodiment described above. The present disclosure is susceptible to modification, improvement, etc. as appropriate. In addition, the materials, shapes, dimensions, values, forms, numbers, arrangement locations, etc. of the components according to the above-described embodiments are arbitrary as long as the present disclosure can be achieved. However, the present invention is not restricted to such an arrangement.

The present application is based on Japanese Patent Application No. 2021-059170, filed on Mar. 31, 2021, Japanese Patent Application No. 2021-059171, filed on Mar. 31, 2021, Japanese Patent Application No. 2021-059172, filed on Mar. 31, 2021, and Japanese Patent Application No. 2021-059173, filed on Mar. 31, 2021, the contents of which are incorporated herein by reference.

The invention claimed is:

1. An intercom device comprising:
    an entrance slave unit configured to call and talk from a visitor to a resident; and
    a living room master device configured to respond to a call from the entrance slave unit,
    wherein the entrance slave unit includes a touch operable aerial display configured to display an aerial image toward the visitor, a control unit configured to control the touch operable aerial display, and a sensor arranged in a predetermined space and capable of detecting a height of an eye level of the visitor,
    wherein the touch operable aerial display includes a light source for emitting light to generate the aerial image, an optical member for reflecting and transmitting the light so as to form the aerial image in the predetermined space, and a detection unit for detecting an operation input of the visitor with respect to the aerial image, and
    wherein, when the height detected by the sensor is equal to or lower than a predetermined threshold value, the control unit changes a display angle of the aerial image such that an upper side of the aerial image having a rectangular shape is inclined in a direction approaching the visitor than a lower side of the aerial image.

2. The intercom device according to claim 1, wherein when the height is equal to or higher than a predetermined threshold value, the control unit raises a display position than in a case in which the height is lower than the predetermined threshold value.

3. The intercom device according to claim 1, wherein, when the height is higher than a predetermined threshold value, the control unit changes the display angle so that the aerial image is vertical or so that the lower side is inclined in a direction approaching the visitor than the upper side.

4. An intercom device comprising:
- an entrance slave unit configured to call and talk from a visitor to a resident; and
- a living room master device configured to respond to a call from the entrance slave unit,
- wherein the entrance slave unit includes a touch operable aerial display configured to display an aerial image toward the visitor, a control unit configured to control the touch operable aerial display, and a sensor arranged in a predetermined space and capable of detecting an attribute of the visitor,
- wherein the touch operable aerial display includes a light source for emitting light to generate the aerial image, an optical member for reflecting and transmitting the light so as to form the aerial image in the predetermined space, and a detection unit for detecting an operation input of the visitor with respect to the aerial image,
- wherein the control unit changes a display mode of a call operation acceptance unit based on the attribute detected by the sensor,
- wherein the attribute is at least one of a height and an age of the visitor,
- wherein the control unit displays the call operation acceptance unit in a first display mode when the height or the age is equal to or higher than a predetermined threshold value, and
- wherein the control unit displays the call operation acceptance unit in a second display mode which is a simpler display mode than the first display mode when the height or the age is lower than the predetermined threshold value.

5. The intercom device according to claim 4, wherein the second display mode includes at least one from among a mode in which a number of call buttons included in the call operation acceptance unit is reduced than in the first display mode, and a mode in which a size of the call buttons is increased than in the first display mode.

6. The intercom device according to claim 4, wherein the attribute includes whether or not the visitor is a person associated with a building in which the entrance slave device is installed,
- wherein the control unit displays the call operation acceptance unit in a third display mode different from the first display mode when the visitor is a person associated with the building, and
- wherein the control unit displays the call operation acceptance unit in the first display mode when the visitor is not a person associated with the building.

7. The intercom device according to claim 6, wherein the first display mode is a display mode including at least a numeric keypad, and
- wherein the third display mode is a display mode including at least a display of a room number in the building to which the visitor is associated.

8. The intercom device according to claim 4, wherein the control unit changes a language notation of the call operation acceptance unit according to the attribute.

* * * * *